United States Patent
Edwards

(10) Patent No.: US 11,130,588 B2
(45) Date of Patent: Sep. 28, 2021

(54) WING ASSEMBLY WITH FLUID PIPE

(71) Applicant: AIRBUS OPERATIONS LIMITED, Bristol (GB)

(72) Inventor: Paul Edwards, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 79 days.

(21) Appl. No.: 16/515,332

(22) Filed: Jul. 18, 2019

(65) Prior Publication Data
US 2020/0031489 A1 Jan. 30, 2020

(30) Foreign Application Priority Data
Jul. 25, 2018 (GB) ..................................... 1812136

(51) Int. Cl.
*B64D 37/00* (2006.01)
*B64C 3/26* (2006.01)
*B64C 3/18* (2006.01)

(52) U.S. Cl.
CPC .............. *B64D 37/00* (2013.01); *B64C 3/187* (2013.01); *B64C 3/26* (2013.01)

(58) Field of Classification Search
CPC ........... B64D 37/00; B64C 3/187; B64C 3/26; B64C 3/18
USPC ...................................................... 244/123.1
See application file for complete search history.

(56) References Cited

U.S. PATENT DOCUMENTS

| | | | |
|---|---|---|---|
| 3,543,222 A | 11/1970 | Rheinfelder | |
| 4,141,577 A | 2/1979 | Beebe | |
| 9,932,106 B1 | 4/2018 | Gardiner et al. | |
| 2009/0206203 A1* | 8/2009 | Crawford ................. | B64F 5/10 244/123.7 |
| 2012/0132755 A1* | 5/2012 | Petit ......................... | F16L 5/12 244/131 |
| 2013/0099067 A1 | 4/2013 | Hansom et al. | |
| 2013/0320149 A1* | 12/2013 | Fraysse ................ | B64D 37/005 244/135 R |
| 2017/0210482 A1 | 7/2017 | Morgan | |

FOREIGN PATENT DOCUMENTS

| | | |
|---|---|---|
| EP | 3 031 713 | 6/2016 |
| GB | 794571 | 5/1958 |
| WO | 2008012569 | 1/2008 |

OTHER PUBLICATIONS

"Two Hole 90 Degree Strap for CPVC", Polygon International Technology Inc., retrieved Jul. 10, 2019, 2 pages, http://polygon-tech.com/index.php?id_category=420&controller=category.
Combined Search and Examination Report for GB Application No. 1812136.8 dated Jan. 23, 2019, 5 pages.
Extended European Search Report for European Application No. 19184637.7, eight pages, dated Nov. 18, 2019.

* cited by examiner

*Primary Examiner* — Brady W Frazier
(74) *Attorney, Agent, or Firm* — Nixon & Vanderhye P.C.

(57) ABSTRACT

A wing assembly with at least two ribs is disclosed. Each rib defines a rib plane and has a peripheral edge. A fluid pipe extends through each rib plane and is disposed external to the peripheral edge of each rib. The fluid pipe is coupled to each rib.

19 Claims, 12 Drawing Sheets

WING ASSEMBLY WITH FLUID PIPE

CROSS RELATED APPLICATION

This application claims priority to United Kingdom (GB) Patent Application 1812136.8, filed Jul. 25, 2018, the entire contents of which are hereby incorporated by reference.

FIELD OF THE INVENTION

The present invention relates to a wing assembly, a fixed wing aircraft including the wing assembly, and a method of assembling a wing box.

BACKGROUND OF THE INVENTION

Aircraft wing boxes can be provided with fluid conduits, such as fuel lines, that extend through multiple ribs and across multiple rib bays. The wing box is assembled with the ribs received between the bottom and top skin covers and the fluid conduits are subsequently installed in the wing box.

To install the fluid conduits apertures are formed in the ribs and connectors are mounted to either side of the aperture. Individual pipe sections are joined between connectors on adjacent ribs to form the fluid conduit. Such an assembly process is time consuming and complex.

SUMMARY OF THE INVENTION

According to an aspect of the invention, there is provided a wing assembly comprising at least two ribs with each rib defining a rib plane and having a peripheral edge, and a fluid pipe wherein the fluid pipe extends through each rib plane and is disposed external to the peripheral edge of each rib, wherein the fluid pipe is coupled to each rib.

According to another aspect of the invention, there is provided a fixed wing aircraft including a wing assembly as described above.

According to a further aspect of the invention, there is provided a wing assembly comprising a fluid pipe, at least two ribs each having a peripheral edge and a skin, wherein the fluid pipe is between the peripheral edge of each of the at least two ribs and the skin.

According to a further aspect of the invention, there is provided a method of assembling a wing box, the method comprising the steps of providing a wing box having at least two ribs, each of the at least two ribs defining a rib plane, attaching a fluid pipe to extend through the rib plane of each of the at least two ribs, and subsequently attaching a skin to the wing box.

The invention is advantageous in that the fluid pipe is attached to each rib in one piece, without requiring the fluid pipe to be split into multiple sections that each fit in the rib bays between adjacent ribs. The fluid pipe can be prepared separately from the wing assembly, so that the entire continuous fluid pipe section is brought to the wing box and coupled to each rib in one operation. This reduces the number of manufacturing steps, reducing assembly complexity, assembly time, and the number of assembly components.

The wing assembly may comprise a skin on each rib, and wherein the fluid pipe is disposed between the peripheral edge of each rib and the skin.

By providing the fluid pipe between the peripheral edge of each rib and the skin, the fluid pipe can extend through multiple rib planes without being extended through a hole in the main rib body that would constrain the fluid pipe and make assembly/disassembly difficult.

The wing assembly may comprise a space between the fluid pipe and the skin. The fluid pipe may be spaced from the skin along a portion of its length, or its entire length. The fluid pipe may be spaced from the skin at each rib, or the fluid pipe may be spaced from the skin between each rib.

The fluid pipe may be non-contiguous with the skin. Non-contiguous meaning that the fluid pipe and skin do not touch or share a common border.

The skin may be a lower aerodynamic skin, or the skin may be an upper aerodynamic skin. The skin may be a skin panel. The skin may be a lower surface of a wing box or may be an upper surface of a wing box.

The fluid pipe may be hung from each of the at least two ribs.

The fluid pipe may have a cross-section that is uninterrupted as the fluid pipe extends through each rib, such that the fluid pipe does not include a join region at a rib between separate sections of fluid pipe.

Each rib may comprise a recess, and the fluid pipe may be disposed in the recess of each rib.

The wing assembly may have a leading end and a trailing end and the recess may be disposed proximate one of the leading end and the trailing end.

The fluid pipe may be configured to carry fuel. The fluid pipe may be an annulus, and may carry fuel within the annulus. The fluid pipe may be a scavenge pipe or a vent pipe.

The wing assembly may comprise an insert at each of the at least two ribs, and the insert may be disposed between the fluid pipe and each rib. The insert may be a rubber insert. The insert may be a different suitable material, such as plastic.

The wing assembly may comprise a retainer, and the fuel pipe may be coupled to each rib by the retainer at each rib.

The retainer at each rib may extend through the rib plane and may be coupled on both sides of the rib plane.

The first fastening member may be coupled to a second side of each rib.

The first fastening member may be coupled to a first side and a second side of each of the ribs.

The retainer may comprise a first fastening member and a second fastening member, wherein the first fastening member may be coupled to a first side of each rib and the second fastening member may be coupled to a second side of each rib.

The fastening member may be shaped to accept the fluid pipe. The fastening member may be made from plastic, metal, composite material or any other suitable material.

The method may include wherein the at least two ribs each have a peripheral edge, and the method further comprises attaching the fluid pipe external to each peripheral edge of each of the at least two ribs.

The method may include disposing the fluid pipe between each of the at least two ribs and the skin.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
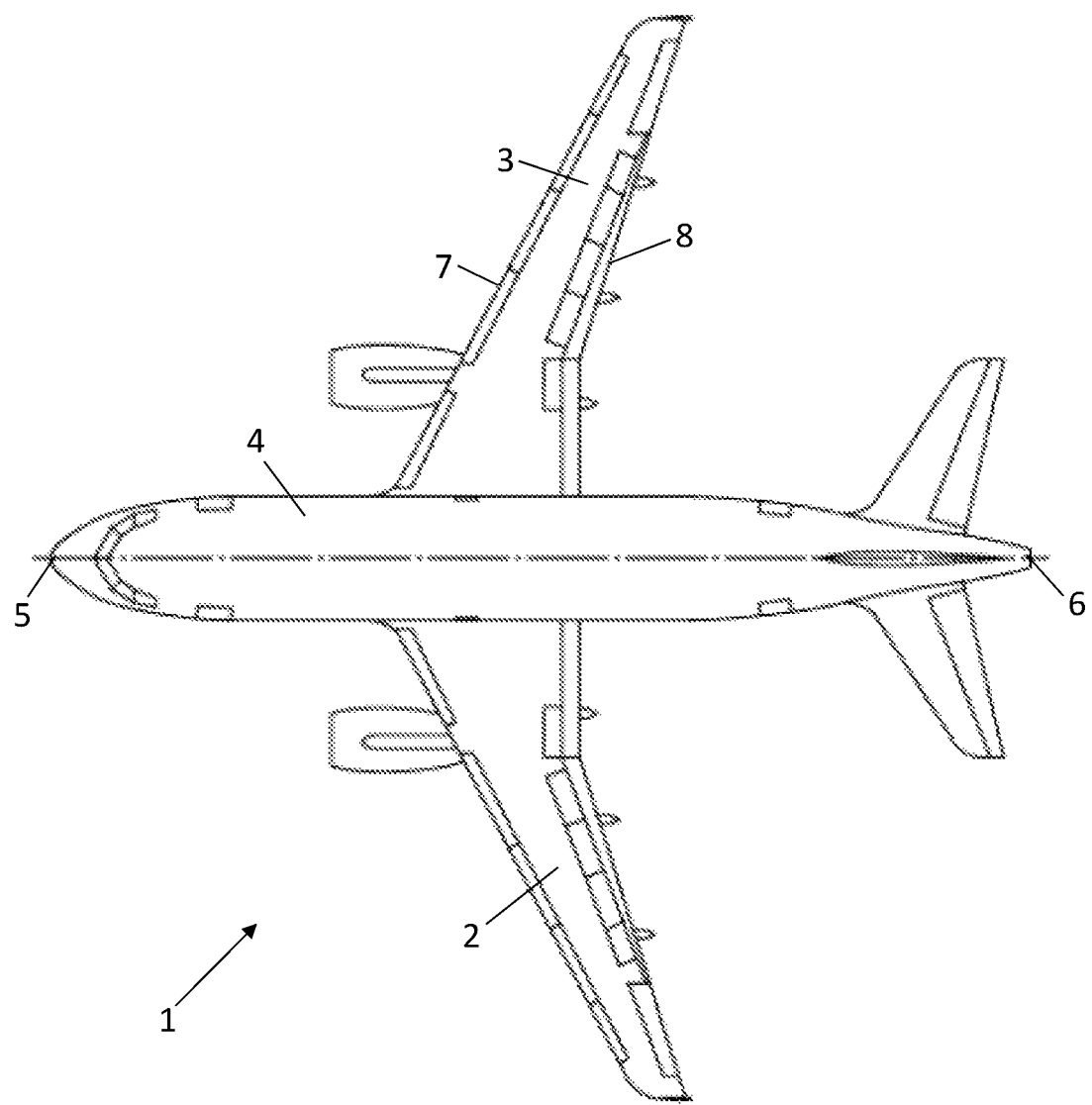
FIG. 1 is a plan view of an aircraft.

FIG. 1 shows an existing aircraft 1 with port and starboard fixed wings 2, 3, a fuselage 4 with a nose end 5 and a tail end 6. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Figure 2A:
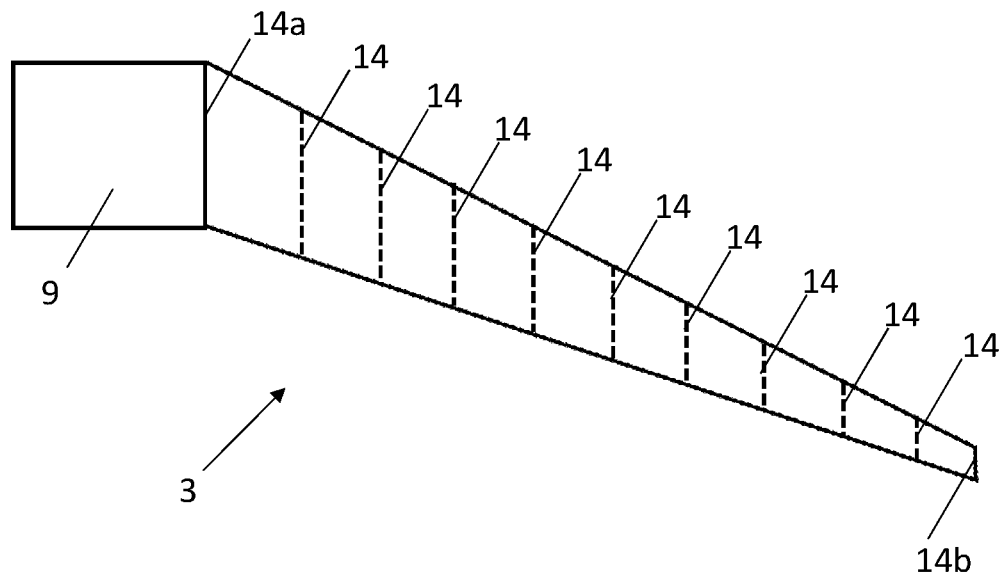
FIG. 2a is a plan view of a starboard wing.

Each wing has a cantilevered structure with a length extending in a span-wise direction from a root to a tip, the root being joined to an aircraft fuselage 4. The wings 2, 3 are similar in construction so only the starboard wing 3 will be described in detail with reference to FIGS. 2 and 3.

The aircraft 1 includes a centre wing box 9 within the body of the fuselage 4. The centre wing box 9 is joined to an inboard rib 14a which forms the root of the wing 3. The wing 3 includes a series of spaced ribs 14 between the inboard rib 14a and an outboard rib 14b at the starboard wing tip. Each rib 14 defines a rib plane. The rib plane of each rib extends substantially parallel to the or each adjacent rib plane. The orientation of adjacent ribs with respect to each other may vary. The rib plane extends substantially parallel to a chord axis of the wing 3. The ribs 14 form part of a wing box on the starboard wing 3 the wing box 9 also including a front spar 10 and an upper skin cover 11, a rear spar 12, and a lower skin cover 13. The rib attaches to the front spar 10 and rear spar 12 using brackets 16.

In the following description, the term "front" refers to components towards a leading edge 7 of the wing, and the term "rear" refers to components towards a trailing edge 8 of the wing. The terms "forward" and "rearward" shall be construed accordingly. The position of features may be construed relative to other features, for example a forward component may be disposed on a forward side of another component, but towards the rear of the vehicle. Similarly, the terms "upper" and "lower" refer to the position of features relative to other features and in accordance with a normal orientation of the aircraft 1.

Figure 2B:
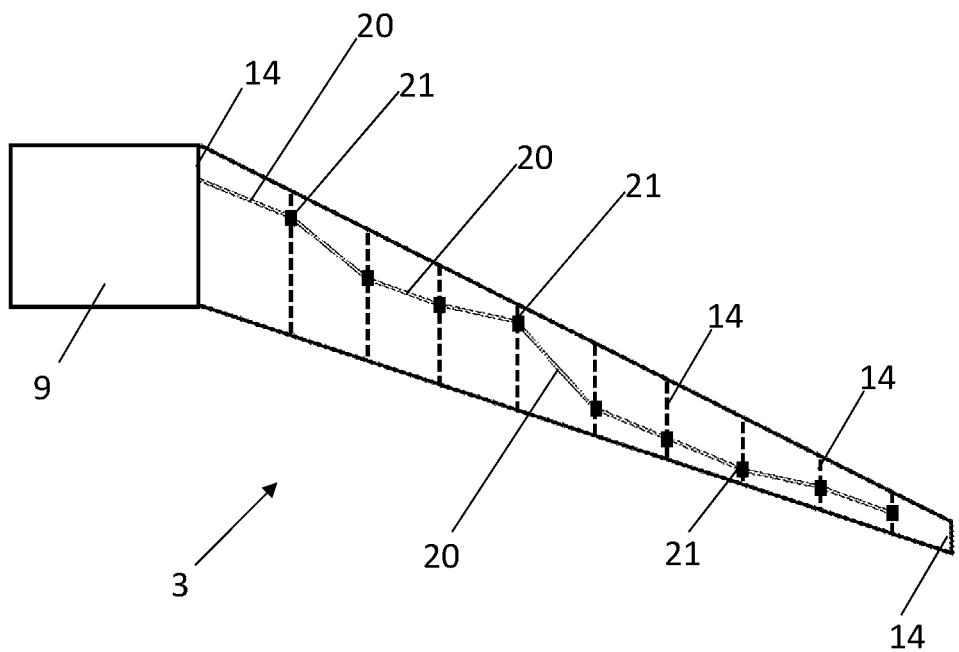
FIG. 2b is a plan view of an existing fuel line on a starboard wing.
Figure 3A:
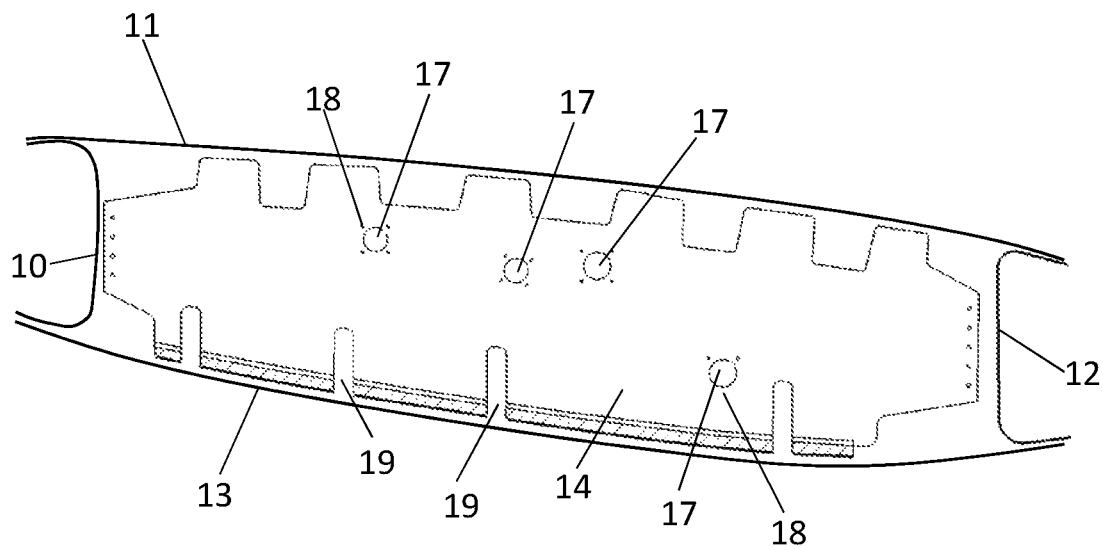
FIG. 3a is a side profile view of a wing box.
Figure 3B:
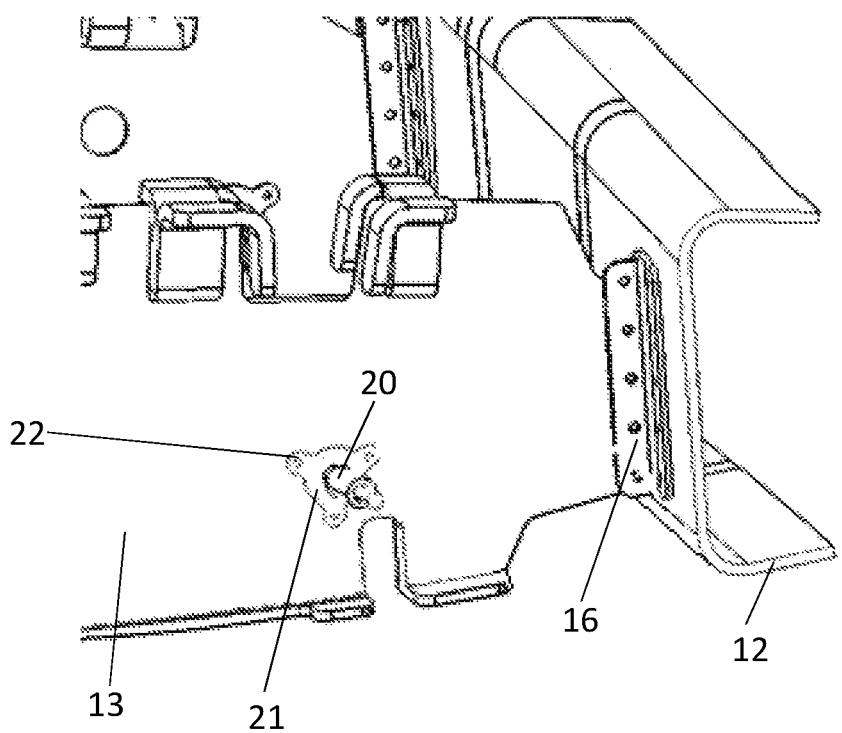
FIG. 3b is an existing connection for a fuel line through a rib of a wing box.

In an existing wing box shown in FIGS. 2b & 3a-b, a fuel line extends across multiple ribs. The fuel line extends through holes 17 positioned within the body of the rib 14, making it difficult to install the fuel line within the assembled wing box. As a result, the fuel line is formed from multiple short fuel pipe sections 20 that connect to adjacent fuel pipes 20 at ribs 14 using pipe connectors 21 located at the ribs 14. The pipe connectors 21 are disposed on opposing sides of each rib 14 to surround the hole 17. The fuel line therefore extends across nine ribs 14 through holes 17, although the fuel line may extend across a different number of ribs 14.

The pipe connectors 21 attach to the ribs 14 using fasteners (not shown) that extend through fixing apertures 18, 22 in the ribs 14 and connector 21.

The ribs 14 also include mouse holes 19 adjacent the lower skin 13 that allow stiffeners (not shown) which attach to the lower skin 13 to extend through the ribs 14.

Figure 4A:
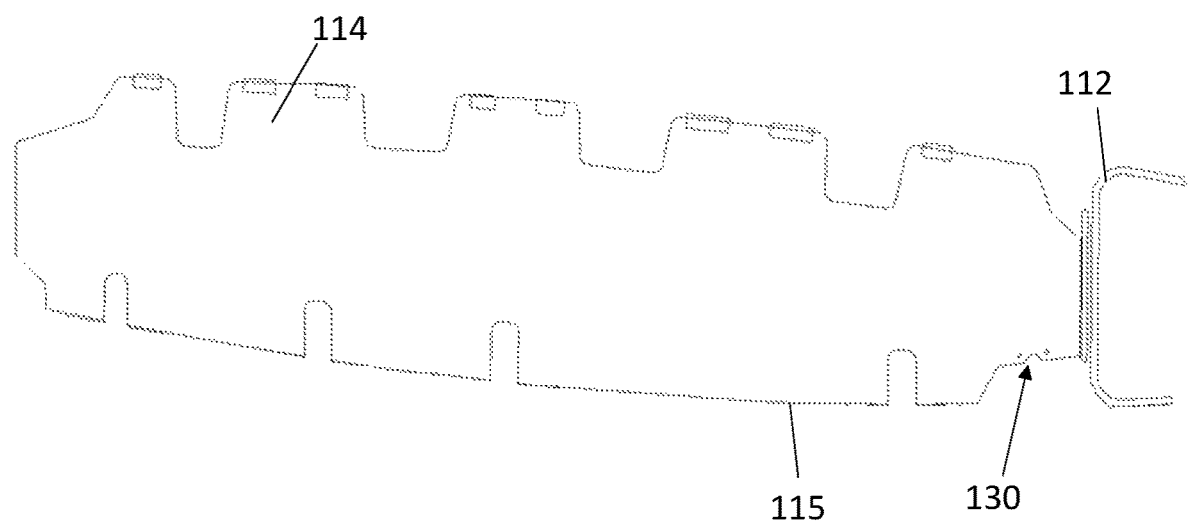
FIG. 4a is a recess in a rib according to a first example.
Figure 4B:
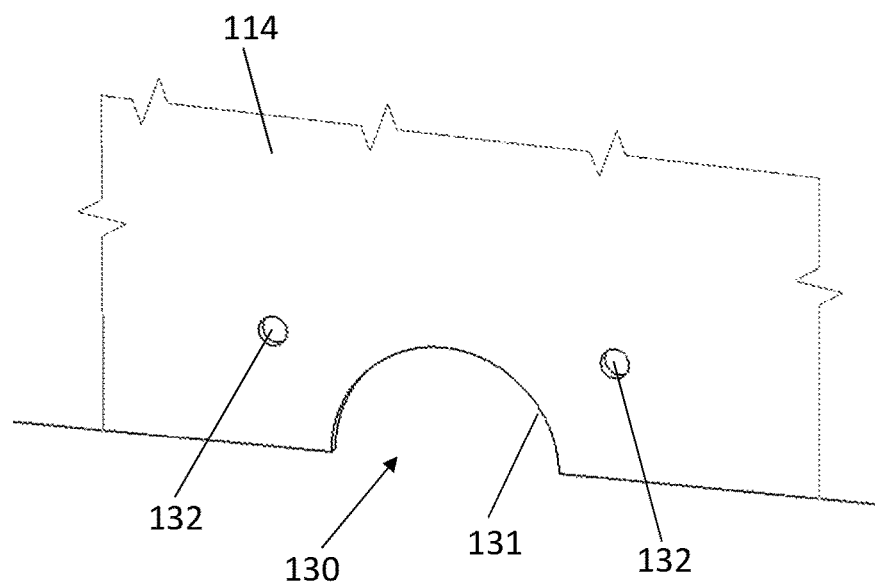
FIG. 4b is an enlarged view of the recess of the first example.

FIG. 4a shows a wing assembly in accordance with a first embodiment of the invention. The wing assembly shares many common features with the existing wing assembly shown in FIGS. 1-3 and so similar reference numerals are used to denote similar parts with the existing wing assembly, except they are numbered in the 100 series.

Figure 7A:
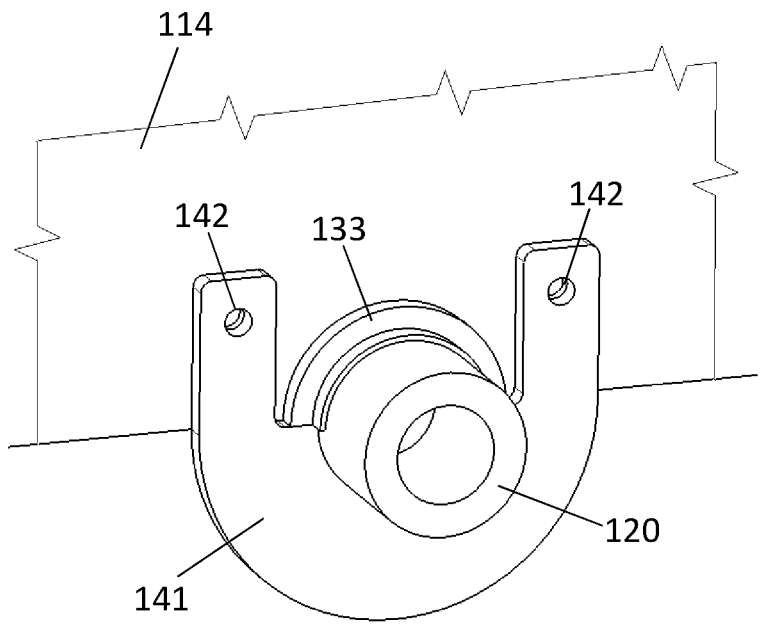
FIG. 7a shows an isometric view of a fastening member according to the first example.
Figure 7B:
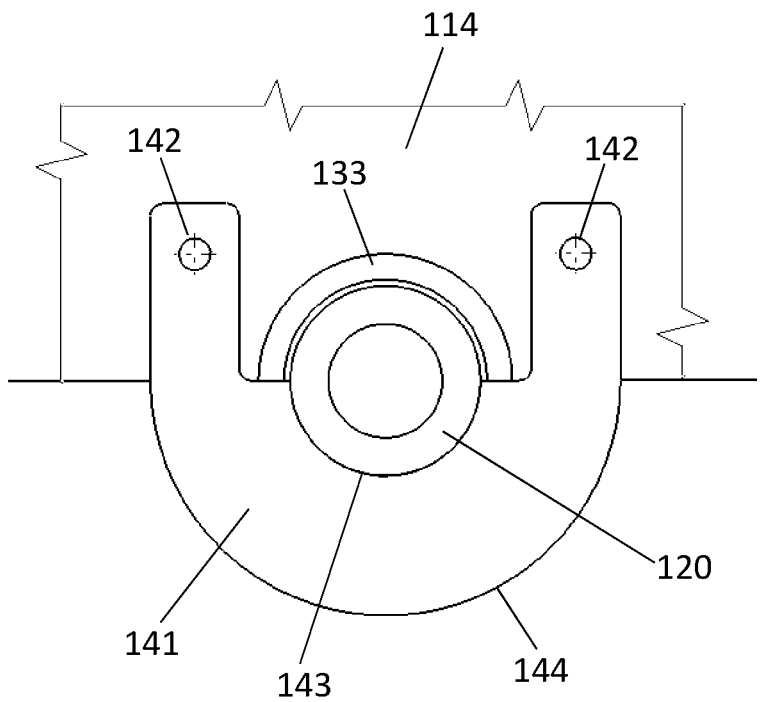
FIG. 7b shows a plan view of the fastening member according to the first example.
Figure 8A:
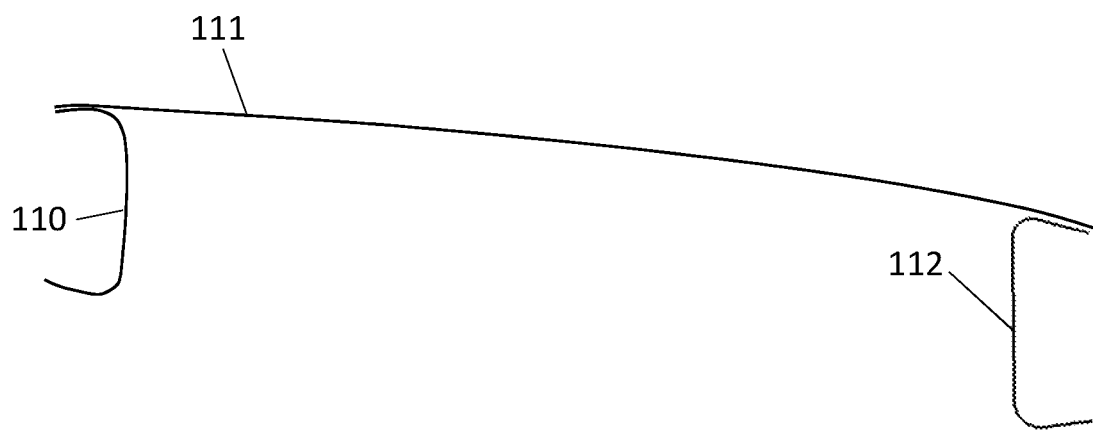
FIG. 8a shows a front spar, upper skin cover connected to a rear spar according to the first example.
Figure 8B:
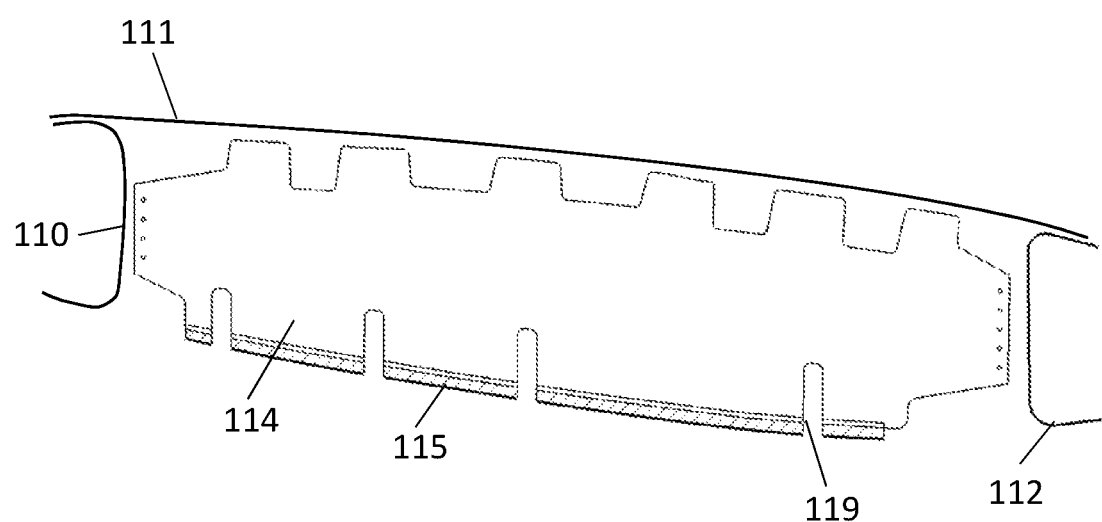
FIG. 8b shows a rib attached to the rear spar, upper cover and front spar.
Figure 8C:
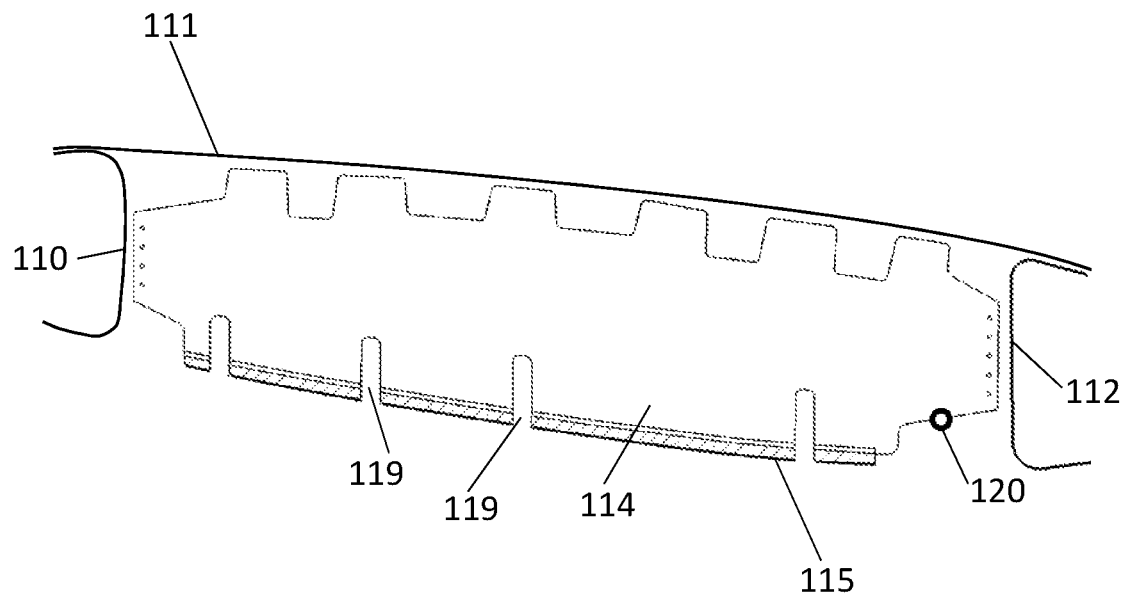
FIG. 8c shows a fluid pipe attached to the rib.
Figure 8D:
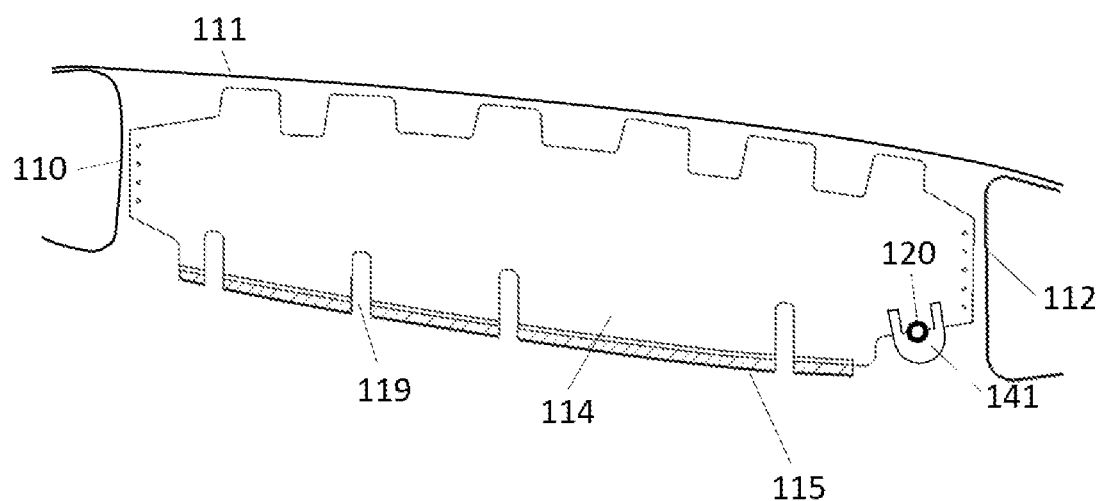
FIG. 8d shows a fastening member coupling the fluid pipe to the rib.
Figure 8E:
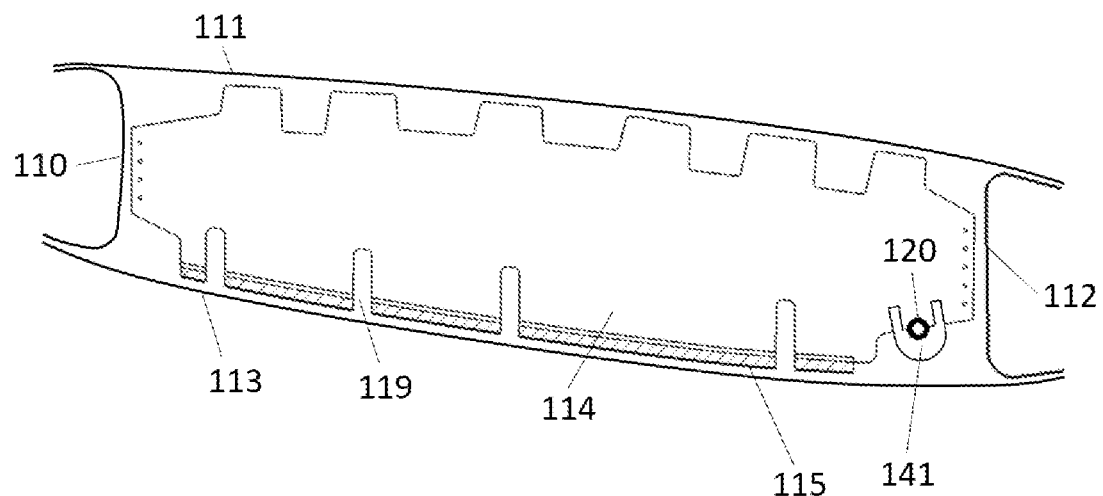
FIG. 8e shows a lower skin attached to the rib according to the first example.

Rib 114 is connected to a rear spar 112, a front spar 110, an upper cover and a lower cover (not shown). The rib 114 includes a rib plane and a peripheral edge 115 that encloses a rib area. A recess 130 is formed in the peripheral edge 115 of the rib 114, along with two attachment holes 132 drilled into the rib body 114 for attaching a retainer that has a fastening member 141 (shown in FIG. 7a) with fasteners (not shown). The attachment holes 132 can be small due to the low load level expected at the attachment region. The recess 130 is located adjacent the rear spar 112 and lower skin 113 and is shaped with a semi-circular edge 131 to accept a fluid pipe 120.

The fluid pipe 120 is a fuel conduit, such as a fuel pipe, vent pipe or scavenge pipe. The fluid pipe may be configured to carry a liquid and/or a gas. The fluid pipe 120 has a generally uniform cross-section along its length. This aids fluid flow, and restricts flow disturbances.

The flanges of the rear spar 112 extend away from the rib 114. As such, access to the area of the recess 130 is provided to allow the fluid pipe 120 to, be fitted inside the recess 130 whilst the rear spar 112 is in place.

Figure 5A:
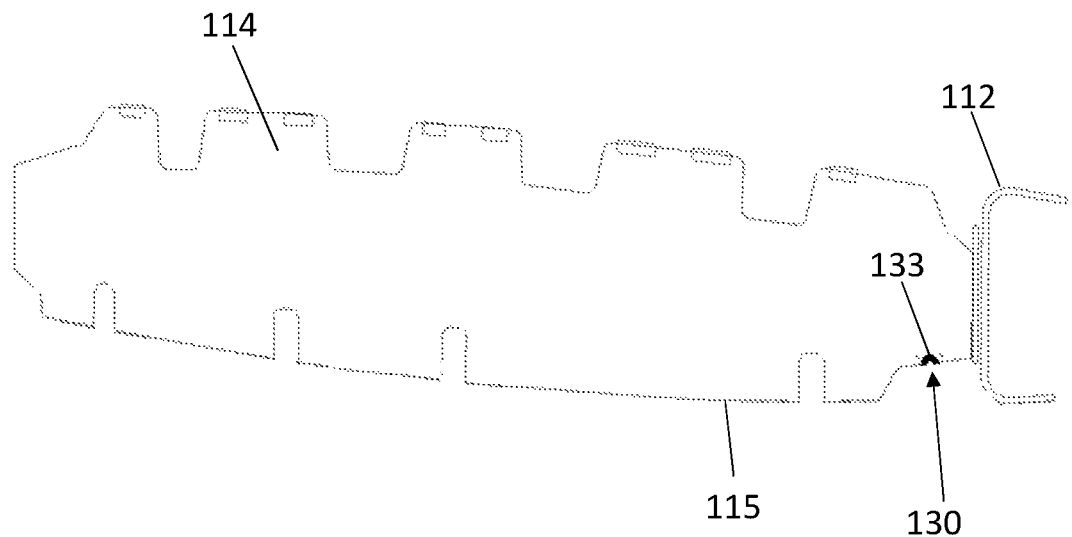
FIG. 5a is a rubber insert in a rib according to the first example.
Figure 5B:
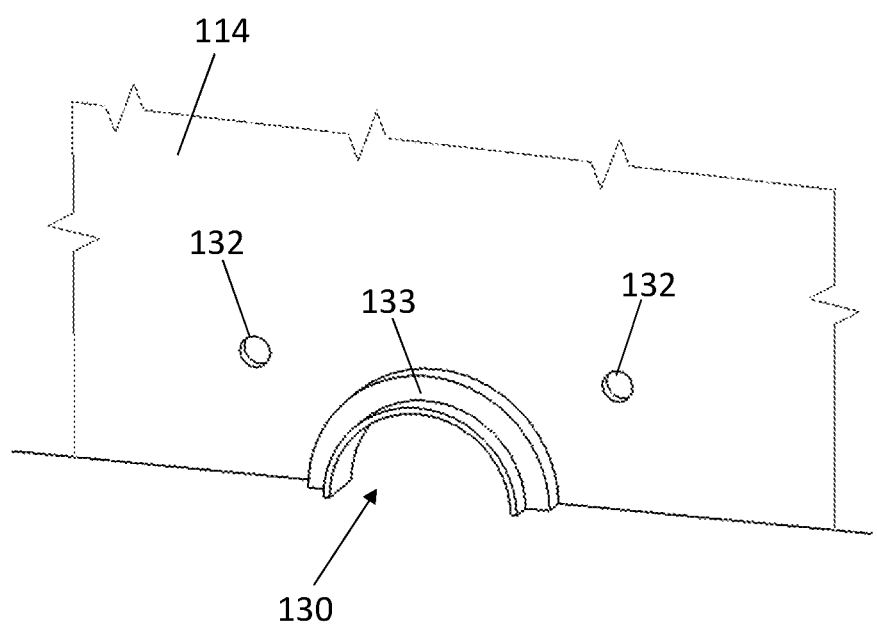
FIG. 5b is an enlarged view of the rubber insert in a rib according to the first example.
Figure 6A:
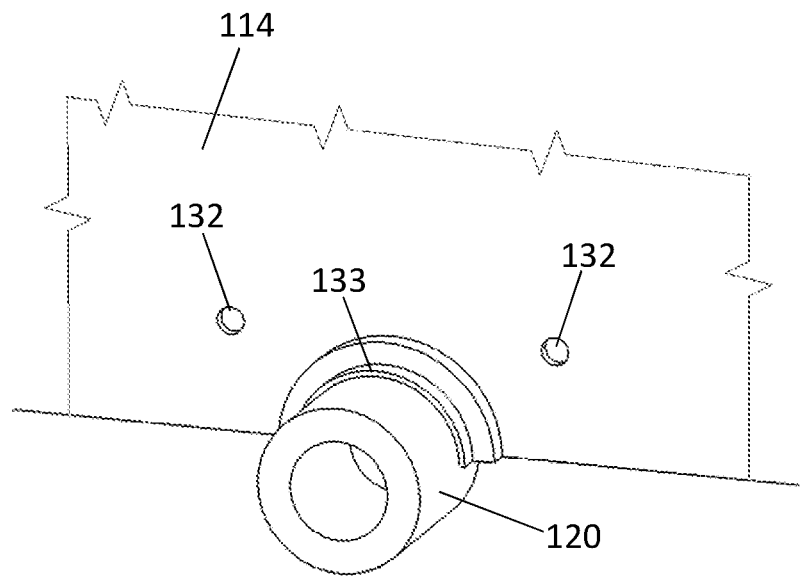
FIG. 6a is an isometric view of the fluid pipe according to a first example.
Figure 6B:
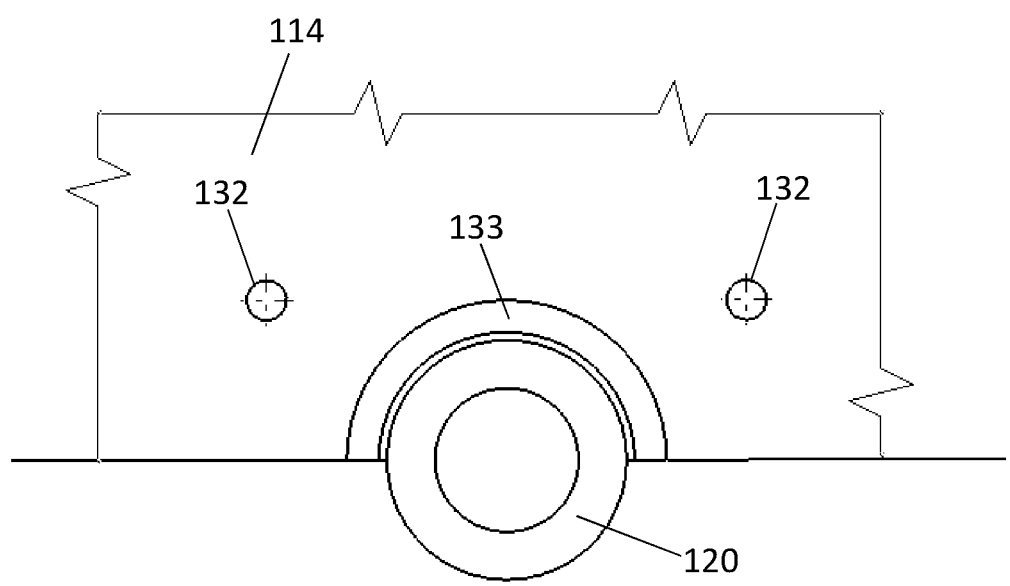
FIG. 6b is a plan view of the fluid pipe according to the first example.

To minimise excessive tolerances, and reduce abrasive contact between the recess 130 and the fluid pipe 120, the recess edge 131 is shrouded by an insert 133 (shown in FIGS. 5a & 5b). The insert 133 is rubber, although alternative materials may be used.

The fluid pipe 120 fits inside the recess 130 against the rubber insert 133 on the underside of the rib 114. A fastening member 141 is then attached to the rib using a fastener (not shown) that extends through holes 142 of the fastening member 141 and holes in the rib 132. The fluid pipe 120 is locked between the rib 114 and the fastening member 141. The inside edge of the fastening member 141 that contacts the fluid pipe 120 is shaped to fit the semi-circular section of fluid pipe 120 that extends below the rib 114.

The tight fit between the rib 114 and the fastening member 141 restricts movement of the fluid pipe 120 at the rib junctions in order to reduce chafing, although it will be clear that the fit may be tailored to provide a looser or tighter grip, as required.

Attaching the fluid pipe 120 to a peripheral edge 115 of the rib 114 is a convenient means of assembling the fluid pipe 120 across the rib planes of multiple ribs 114, without cutting the fluid pipe 120 into multiple sections that individually traverse each rib bay. Instead the fluid pipe 120 can be one uninterrupted longer fluid pipe 120 that extends through multiple ribs 114, thereby reducing parts count and complexity of the assembly.

Assembly of the wing box includes attachment of the front spar 110, upper skin cover 111 and rear spar 112, and then attaching ribs 114 to the spar-cover 111 and rear spar 112 using brackets (not shown).

Prior to assembling the lower skin cover 113 to the wing box, a fluid pipe 120 is fitted across the ribs 114 and attached to each rib using fastening members 141. The fluid pipe 120 can be assembled using a jig or similar tooling to assist the assembly. The lower skin cover 113 can then be attached to the front and rear spars 111, 112 to enclose the fluid pipe 120 within the wing box.

Figure 9:
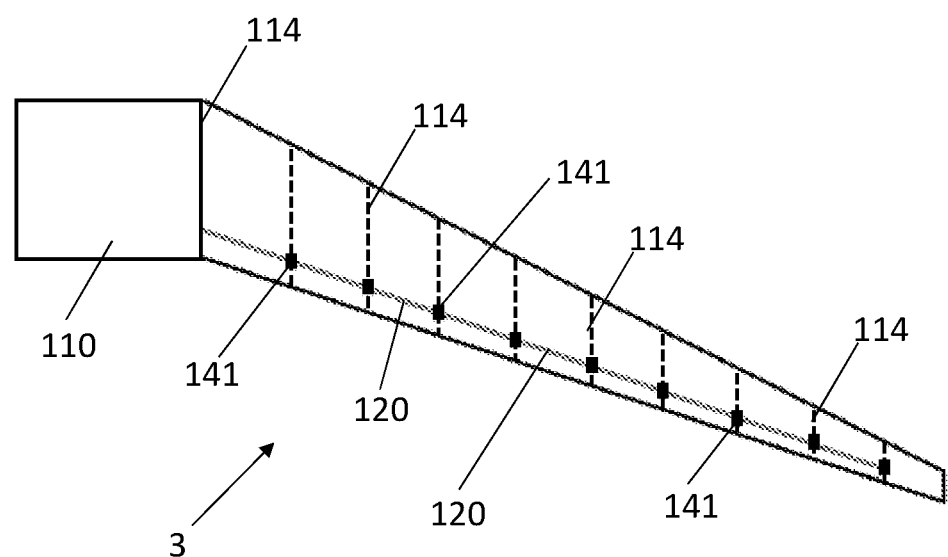
FIG. 9 shows a planform view of the fluid pipe on a starboard wing according to the first example.

As shown in FIG. 9, the fluid pipe 120 extends across multiple ribs 114 and is attached to each rib using a fastening member 141. During maintenance or disassembly the fluid pipe 120 can be removed or inspected easily by removing the lower skin cover 113 and disconnecting the fastening members 141.

Figure 10:
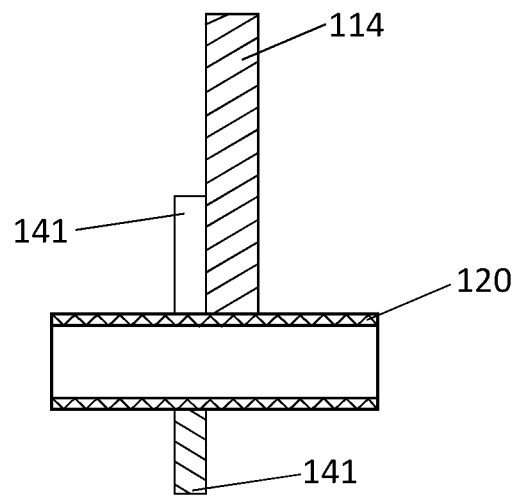
FIG. 10 shows a fastening member attached to a first side of a rib.
Figure 11A:
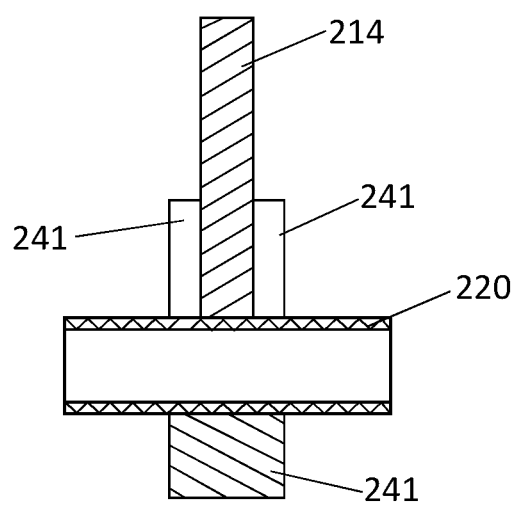
FIG. 11a shows a fastening member attached to two sides of a rib.
Figure 11B:
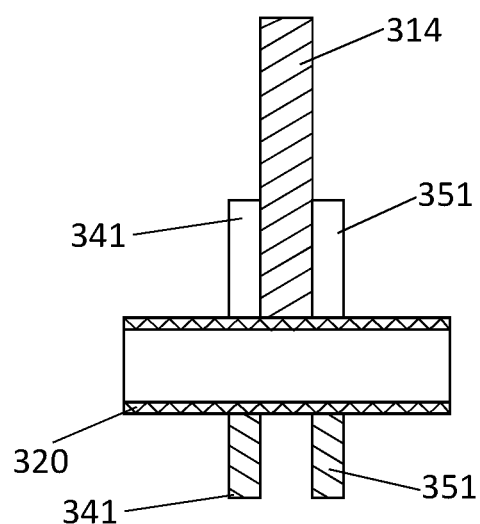
FIG. 11b shows first and second fastening member attached to opposing sides of a rib.
Figure 12A:
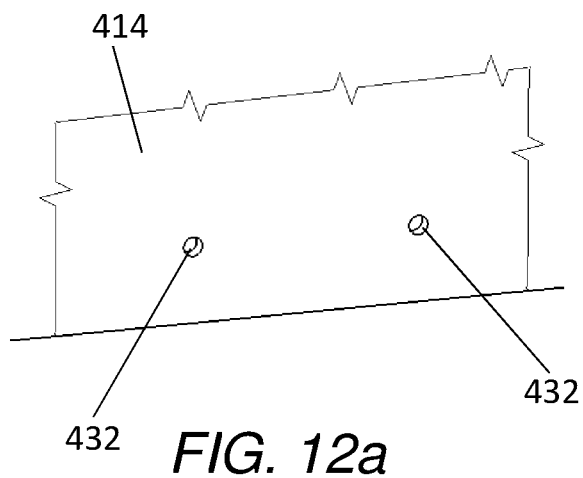
FIG. 12a shows two fastening holes in a rib according to a second example of the assembly.
Figure 12B:
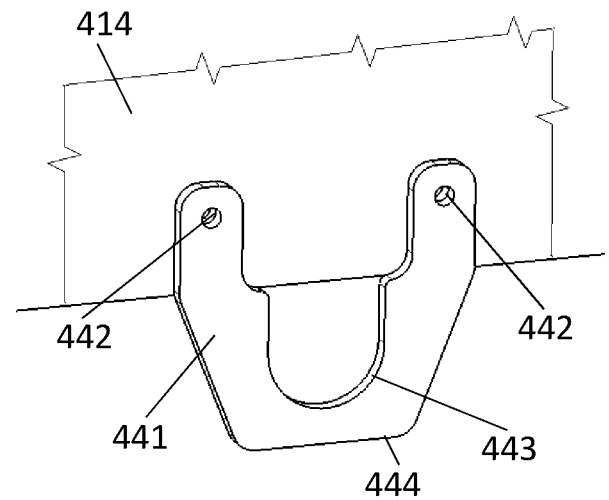
FIG. 12b shows a fastening member attached to a rib according to the second example of the assembly.
Figure 12C:
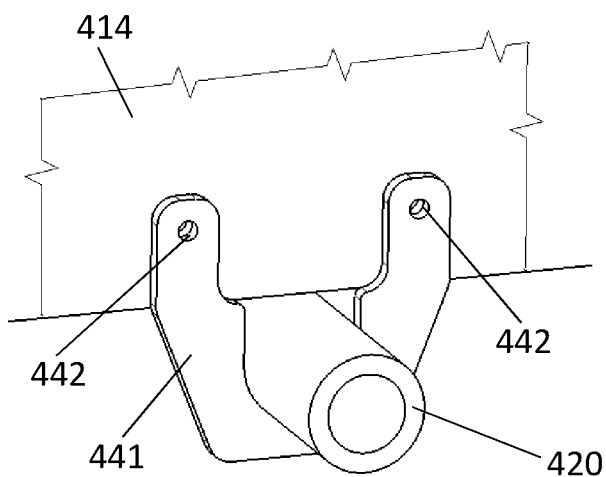
FIG. 12c shows a fluid pipe attached to the rib by the fastening member according to the second example of the assembly.

The fastening member 141 of the retainer is connected to one side of the rib 114 (See FIG. 10), however in an alternative example numbered in the 200 series so that similar features have similar reference numerals to the first retainer example, the fastening member 241 is connected to two sides of the rib 214.

In a third example of the retainer, numbered in the 300 series so that similar features have similar reference numerals to the first and second retainer examples, the fluid pipe 320 is connected to the rib 314 by a first fastening member 341 on one side of the rib and a second fastening member 351 on an opposing side of the rib 314.

In a fourth example, numbered in the 400 series so that similar features have similar reference numerals to the first example, the rib 414 has no recess to accept the fluid pipe 420. Instead the fastening member 441 is shaped so that the fluid pipe 420 is disposed entirely within the inside edge 443 of the fastening member 441 with only the upper-most point of the fluid pipe 420 supported by the peripheral edge 415 of the rib 414.

In this fourth example the rubber insert is not shown although may be disposed around the inside edge 443 of the retainer and/or along a portion of the peripheral edge 415 of the rib 414. The fastening member 441 is connected to one side of the rib 414, however the fastening member 441 may fasten to both sides of the rib 414 or additionally include a second fastening member connected to the opposing side of the rib 414.

In the examples illustrated the fluid pipe 120 attaches to every rib 114 that is crossed by the fluid pipe 120. However it will be understood that the fluid pipe 120 could alternatively be attached to a discrete number of ribs, such as two or more ribs 114 of a larger series, or alternate ribs 114.

The fluid pipe 120 is shown attached to the rib 114 adjacent to the rear spar 112 and lower skin 113, however it will be understood that the fluid pipe 120 may be attached to the rib 114 at any position along the peripheral edge 115 of the rib 114. For instance, the fluid pipe 120 may be attached adjacent the front spar 110 and upper skin 111.

The fluid pipe 120 may cross each rib at a different location, so that the fluid pipe 120 crosses a first rib 114 adjacent to a front spar 110 and lower skin 113, and crosses a second rib 114 adjacent to the rear spar 112 and lower skin 113. The fluid pipe 120 may therefore include curvature or sharp corners to redirect the fluid pipe 120 between each adjacent rib 114. The fluid pipe 120 may also split into two or more concurrent fluid pipes 120 so that a first fluid pipe 120 crosses a rib 114 at a first location, and a second fluid pipe 120 crosses the same rib 114 at a second location that is different from the first location.

The rubber insert 133 may envelope the inner edge 131 of the recess 130, and/or it may envelope the inner edge 143 of the fastening member 141. The rubber insert 133 may contact only a portion of the fluid pipe 120 circumference, or it may surround the fluid pipe 120 entirely. In other examples the insert 133 may not be rubber, but instead another appropriate material such as plastic. The insert 133 may have a push-fit connection or may be attached to the one or more of the rib 114, fluid pipe 120, or fastening member 141 using sealant or adhesive.

The fastening member 141 is illustrated as between the ribs 114 and the lower skin 113 so that the fastening member 141 wraps around the lower circumference of the fluid pipe 120. However the fastening member 141 may be a slot or quick release mechanism that connects only to a proportion of the lower circumference of the fluid pipe 120. In both cases, the rib 114 peripheral edge 115 provides support to the fluid pipe 120.

The fastening member 141 is illustrated as attached by two fasteners (not shown), however the fastening member 141 may alternatively be attached by more or less fasteners. The fastening member 141 may alternatively be pivotally attached to the rib 114 on one side of the fluid pipe 120 so that the fastening member 141 can pivot to attach to the rib 114 at a second point and enclose the fluid pipe 120 between the rib 114 and fastening member 141.

The recess 130 is shown to have a semi-circular shape to accept half of the fluid pipe 120 cross-section, alternatively the recess 130 may be smaller so that for instance only a quarter of the fluid pipe 120 circumference is accepted into the recess 130.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:
1. A wing assembly, comprising:
at least two ribs with each rib defining a rib plane and having a peripheral edge,
a fluid pipe, and
at least two retainers, each retainer comprising a U-shaped fastening member and a fastener, wherein each

U-shaped fastener member is attached to a respective one of the at least two ribs by its respective fastener, and wherein each U-shaped fastening member does not envelope the fluid pipe, wherein the fluid pipe extends through each rib plane and is disposed external to the peripheral edge of each of the at least two ribs, and wherein the fluid pipe is coupled to each of the at least two ribs by a respective one of the retainers.

2. The wing assembly according to claim 1, comprising a skin on each rib, and wherein the fluid pipe is disposed between the peripheral edge of each rib and the skin.

3. The wing assembly according to claim 2, wherein the fluid pipe is spaced from the skin at each rib.

4. The wing assembly according to claim 2, wherein the fluid pipe is non-contiguous with the skin.

5. The wing assembly according to claim 1, wherein the fluid pipe is hung from each of the at least two ribs.

6. The wing assembly according to claim 1, wherein the peripheral edge of each rib supports the fluid pipe.

7. The wing assembly according to claim 1, wherein the fluid pipe has a cross-section that is uninterrupted as the fluid pipe extends through each rib.

8. The wing assembly according to claim 1, wherein each rib comprises a recess, and wherein the fluid pipe is disposed in the recess of each rib.

9. The wing assembly according to claim 8, wherein the wing assembly has a leading end and a trailing end and the recess of each rib is disposed proximate one of the leading end and the trailing end.

10. The wing assembly according to claim 1, wherein the fluid pipe is configured to carry fuel.

11. The wing assembly according to claim 1, comprising an insert at each of the at least two ribs, wherein each insert is disposed between the fluid pipe and each rib.

12. The wing assembly according to claim 1, wherein the retainer at each rib extends through the rib plane and is coupled on both sides of the rib plane.

13. The wing assembly according to claim 1, wherein for each retainer, the U-shaped fastening member is a first fastening member, and the retainer comprises second fastening member, wherein the first fastening member is coupled to a first side of the respective one of the at least two ribs and the second fastening member is coupled to a second side of the respective one of the at least two ribs.

14. A fixed wing aircraft including the wing assembly of claim 1.

15. A wing assembly, comprising:
a fluid pipe,
at least two ribs each having a peripheral edge,
a retainer at each of the at least two ribs, wherein the fluid pipe is coupled to each rib by the retainer at each of the at least two ribs,
an insert at each of the at least two ribs, wherein each insert is disposed between the fluid pipe and each rib, and
a skin,
wherein the fluid pipe is between the peripheral edge of each of the at least two ribs and the skin, and
wherein the fluid pipe is locked between the rib and the retainer.

16. The wing assembly according to claim 15, wherein the fluid pipe is not enveloped by the retainer.

17. The wing assembly according to claim 15, comprising a space between the fluid pipe and the skin.

18. A method of assembling a wing box, the method comprising the steps:
providing a wing box having at least two ribs, each of the at least two ribs defining a rib plane,
attaching a fluid pipe to extend through the rib plane of each of the at least two ribs, attaching a retainer at each of the at least two ribs, wherein each retainer couples the fluid pipe to each of the at least two ribs, and
subsequently attaching a skin to the wing box,
wherein the at least two ribs each have a peripheral edge, and the method further comprises attaching the fluid pipe external to each peripheral edge of each of the at least two ribs, and
wherein the retainer comprises a U-shaped fastening member with an inside edge, and the inside edge of the fastening member contacts the fluid pipe.

19. The method of assembling a wing box according to claim 18, comprising disposing the fluid pipe between each of the at least two ribs and the skin.

* * * * *